(12) United States Patent
Kim et al.

(10) Patent No.: US 12,515,625 B2
(45) Date of Patent: Jan. 6, 2026

(54) BRAKING SYSTEM AND BRAKING METHOD USING THE SAME

(71) Applicants: Hyundai Motor Company, Seoul (KR); Kia Corporation, Seoul (KR)

(72) Inventors: Gwi Chul Kim, Anyang-Si (KR); Sung In Ju, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 472 days.

(21) Appl. No.: 18/104,046

(22) Filed: Jan. 31, 2023

(65) Prior Publication Data

US 2024/0140380 A1    May 2, 2024

(30) Foreign Application Priority Data

Nov. 2, 2022    (KR) .................. 10-2022-0144170

(51) Int. Cl.
  B60T 8/88    (2006.01)
  B60L 7/26    (2006.01)
        (Continued)

(52) U.S. Cl.
  CPC .............. B60T 8/885 (2013.01); B60L 7/26 (2013.01); B60T 7/12 (2013.01); B60T 8/17616 (2013.01);
        (Continued)

(58) Field of Classification Search
  CPC ...... B60T 8/176; B60T 8/885; B60T 8/17616; B60T 8/94; B60T 7/12; B60T 7/042;
        (Continued)

(56) References Cited

U.S. PATENT DOCUMENTS

2011/0304198 A1*  12/2011  Cottrell, V. ........... B60T 13/586
                                                                          303/2
2013/0253793 A1    9/2013  Lee et al.
                            (Continued)

FOREIGN PATENT DOCUMENTS

CN          113752999 A     12/2021
JP          2019-189109 A   10/2019
                (Continued)

*Primary Examiner* — David R Morris
(74) *Attorney, Agent, or Firm* — Morgan Lewis & Bockius LLP

(57) ABSTRACT

A braking system, may include: a hydraulic braking apparatus including a first hydraulic braking apparatus provided on anyone of front and rear wheels of a vehicle and a second hydraulic braking apparatus provided on the other of the front and rear wheels of the vehicle; a non-hydraulic braking apparatus capable of generating braking force in a wheel provided with the second hydraulic braking apparatus among the front and rear wheels; a main braking force regulator configured for controlling hydraulic braking pressure supplied to the first hydraulic braking apparatus and the second hydraulic braking apparatus; and an auxiliary braking force regulator configured for controlling at least one braking apparatus of the first hydraulic braking apparatus and the non-hydraulic braking apparatus, based on whether an anti-lock braking system (ABS) is operating, when a failure has occurred in the main braking force regulator.

17 Claims, 3 Drawing Sheets

(51) Int. Cl.
*B60T 7/12* (2006.01)
*B60T 8/1761* (2006.01)
*B60T 8/94* (2006.01)
*B60T 13/66* (2006.01)
*B60T 13/74* (2006.01)
*B60T 17/22* (2006.01)

(52) U.S. Cl.
CPC .............. *B60T 8/94* (2013.01); *B60T 13/662* (2013.01); *B60T 13/741* (2013.01); *B60T 17/22* (2013.01); *B60T 2270/10* (2013.01); *B60T 2270/402* (2013.01); *B60T 2270/406* (2013.01); *B60T 2270/604* (2013.01)

(58) Field of Classification Search
CPC ........ B60T 13/66; B60T 13/662; B60T 13/74; B60T 13/741; B60T 2270/10; B60T 2270/402; B60T 2270/406; B60T 2270/604; B60T 2270/60; B60T 1/10; B60T 17/22; B60T 17/221; B60L 7/10; B60L 7/26
See application file for complete search history.

(56) References Cited

U.S. PATENT DOCUMENTS

| | | |
|---|---|---|
| 2019/0331221 A1 | 10/2019 | Shirakawa |
| 2021/0009095 A1 | 1/2021 | Kim |
| 2021/0370899 A1 | 12/2021 | Hwang |
| 2021/0380088 A1 | 12/2021 | Yoo |

FOREIGN PATENT DOCUMENTS

| | | |
|---|---|---|
| KR | 10-2013-0037751 A | 4/2013 |
| KR | 10-2021-0148633 A | 12/2021 |
| WO | WO 2021-246930 A1 | 12/2021 |

\* cited by examiner

BRAKING SYSTEM AND BRAKING METHOD USING THE SAME

CROSS-REFERENCE TO RELATED APPLICATION(S)

The present application claims priority to Korean Patent Application No. 10-2022-0144170 filed on Nov. 2, 2022, the entire contents of which is incorporated herein for all purposes by this reference.

BACKGROUND OF THE PRESENT DISCLOSURE

Field of the Present Disclosure

The present disclosure relates to a braking system and a braking method using the same.

Description of Related Art

A braking device is a device for reducing or stopping the speed of a running vehicle, and may be the most important device for vehicle safety. A braking device of the vehicle is a device converting rotational energy of tires into thermal energy using frictional force to reduce a speed of the vehicle and stop the vehicle.

A vehicle braking device is a device directly related to safety of a driver. In the case that a failure occurs in a vehicle's braking controller, the vehicle cannot drive normally, so that there is a demand for a device capable of controlling braking force of a vehicle instead of a main braking force regulator, in the case that a failure occurs in the main braking force regulator. Therefore, an auxiliary braking force regulator for regulating braking force by controlling a portion of hydraulic braking devices of the vehicle instead of the main braking force regulator has been developed, controlling the braking force without stopping the vehicle, and allowing for safe driving continuously. However, the auxiliary braking force regulator generates braking force by controlling only a portion of hydraulic braking devices of the vehicle, so that the braking force generated by some hydraulic braking devices may cause excessive wheel slip in the vehicle and harm stability of the vehicle, and generate braking force in wheels provided with the other hydraulic braking device, which are not controlled by the auxiliary braking force regulator, so there is demand for a braking system capable of stably driving by distributing the braking force.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a braking system configured for stably generating braking force using a hydraulic braking apparatus and a non-hydraulic braking apparatus, even in a case in which a failure has occurred in a main braking force controller configured for controlling a hydraulic device.

According to an aspect of the present disclosure, a braking system, may include: a hydraulic braking apparatus including a first hydraulic braking apparatus provided on one of front and rear wheels of a vehicle and a second hydraulic braking apparatus provided on another of the front and rear wheels of the vehicle; a non-hydraulic braking apparatus capable of generating braking force in a wheel provided with the second hydraulic braking apparatus among the front and rear wheels; a main braking force regulator configured for regulating braking force by controlling hydraulic braking pressure supplied to the first hydraulic braking apparatus and the second hydraulic braking apparatus; and an auxiliary braking force regulator regulating braking force by controlling at least one braking apparatus of the first hydraulic braking apparatus and the non-hydraulic braking apparatus, based on whether an anti-lock braking system (ABS) is operating, in the case that a failure has occurred in the main braking force regulator.

The non-hydraulic braking apparatus may include at least one of an electronically controlled braking apparatus configured for operating electrically to generate braking force and a regenerative braking controller configured for performing regenerative braking by controlling a driving motor of the vehicle.

The electronically controlled braking apparatus may be an electronic parking brake (EPB).

The auxiliary braking force regulator may control at least one of the first hydraulic braking apparatus, the electronically controlled braking apparatus, and the regenerative braking controller.

An autonomous driving controller configured for determining whether a failure has occurred in the main braking force regulator and the auxiliary braking force regulator may further be included, and in the case that a failure has occurred in the main braking force regulator and the auxiliary braking force regulator, the autonomous driving controller may stop a vehicle using a regenerative braking controller.

The electronically controlled braking apparatus may include a first electronically controlled braking mode and a second electronically controlled braking mode generating braking force.

The first electronically controlled braking mode may be a mode that linearly generates braking force of the electronically controlled braking apparatus.

The second electronically controlled braking mode may be a mode that non-linearly generates braking force of the electronically controlled braking apparatus.

In the second electronically controlled braking mode, an operation of generating and releasing braking force of the electronically controlled braking apparatus is repeatedly performed using the electronically controlled braking apparatus based on an amount of wheel slip provided with the electronically controlled braking apparatus.

According to an aspect of the present disclosure, in a braking system including a main braking force regulator controlling hydraulic braking pressure of a first hydraulic braking apparatus provided on one of front and rear wheels of a vehicle and a second hydraulic braking apparatus provided on another of the front and rear wheels of the vehicle and an auxiliary braking force regulator controlling the hydraulic braking pressure of the first hydraulic braking apparatus, a braking method, the braking method including operations of: driving using the main braking force regulator; determining whether a failure has occurred in the main braking force regulator; and driving using an auxiliary braking force regulator controlling braking force by use of at least one of the first hydraulic braking system, an electronically controlled braking system, and a regenerative braking controller based on whether an anti-lock braking system (ABS) is operating, in the case that a failure has occurred in the main braking force regulator.

In the case that a failure has occurred in the main braking force regulator, an operation of determining whether a failure has occurred in the auxiliary braking force regulator may further be included, and in the case that a failure has occurred in the auxiliary braking force regulator, the vehicle is stopped using the regenerative braking controller.

The operation of driving using the auxiliary braking force regulator may include operations of: selecting one braking mode from a plurality of braking modes in which the first hydraulic braking apparatus, the electronically controlled braking apparatus, and the regenerative braking controller are selectively combined; and driving while controlling braking force based on the braking mode.

The operation of selecting the braking mode may further include: an operation (A) of determining whether a regenerative braking controller is available, and an operation (B) determining whether an electronically controlled braking apparatus may be used when the regenerative braking controller is unavailable.

In operation (B) of determining whether the electronically controlled braking apparatus is available, when the electronically controlled braking apparatus is unavailable, a first braking mode controlling braking force using a first hydraulic braking apparatus may be selected.

Operation (A) of determining whether the regenerative braking controller is available, when the regenerative braking controller is available, may include: an operation (C) of determining whether an anti-lock braking system (ABS) is operating; an operation of selecting a second braking mode generating braking force by controlling the first hydraulic braking apparatus and the regenerative braking controller; and an operation of driving in the second braking mode and performing operation (C) in real time or periodically, wherein when the anti-lock braking system (ABS) is operating, operation (B) may be performed.

Operation (B), when the electronically controlled braking apparatus is available, may include: operation (C) of determining whether an anti-lock braking system (ABS) is operating, an operation of selecting a third braking mode generating braking force by controlling the first hydraulic brake device and the electronically controlled brake device; and an operation of driving in the third braking mode and performing operation (C) in real time or periodically, wherein the third braking mode may be controlled as a first electronically controlled braking mode that linearly generates braking force of the electronically controlled braking apparatus.

When an anti-lock braking system (ABS) is operating, an operation in which the first hydraulic braking apparatus may be controlled according to the anti-lock braking system (ABS), and the electronically controlled braking apparatus drives in a fourth braking mode that generates braking force.

In the fourth braking mode, the braking force of the electronically controlled braking apparatus may be controlled based on an amount of wheel slip occurring in a wheel provided with the electronically controlled braking apparatus.

The electronically controlled braking apparatus may be an electronic parking brake (EPB).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
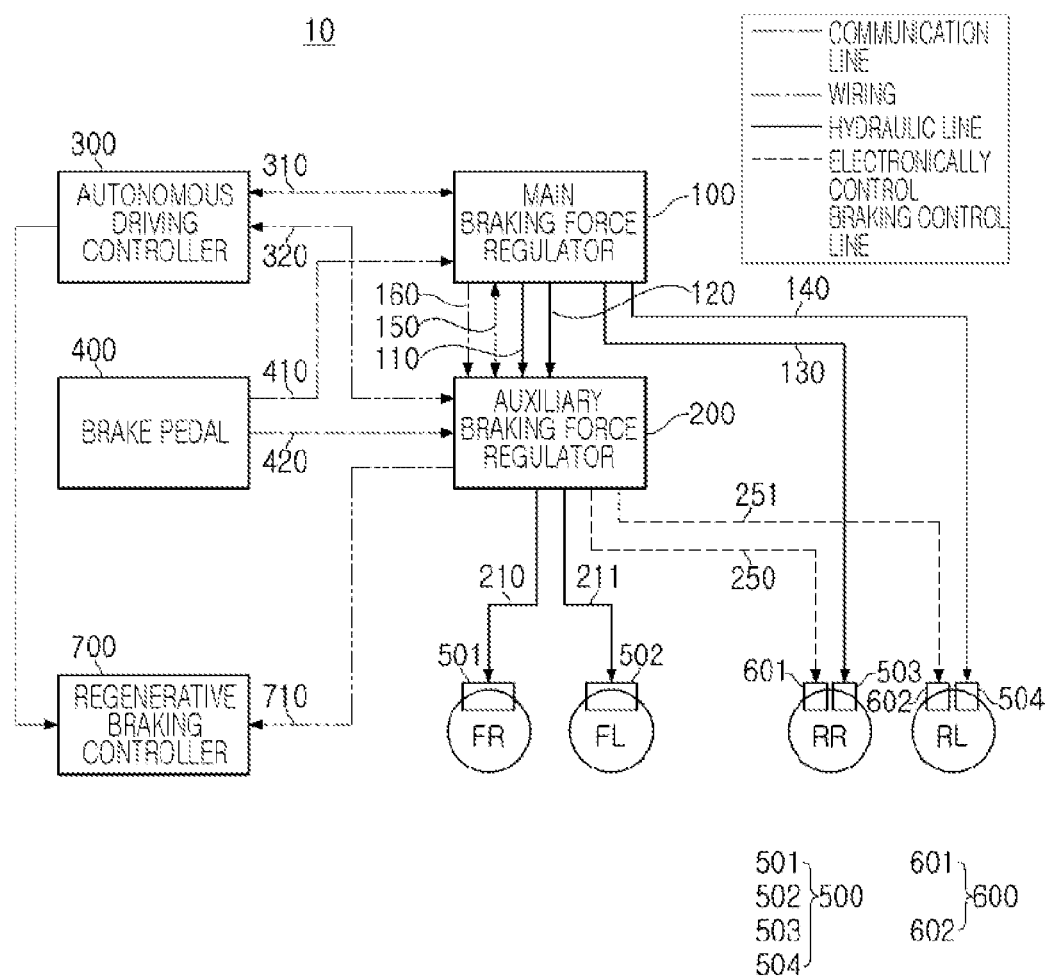
FIG. 1 is a block diagram of a braking system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims. Because the present disclosure may have various changes and may have various exemplary embodiments of the present disclosure, specific embodiments may be illustrated in the drawings and described in detail. However, this is not intended to limit the present disclosure to specific embodiments, it should be understood to include all modifications, equivalents, and substitutes included in the spirit and scope of the present disclosure.

Terms such as first, second, and the like is available to describe various elements, but the elements should not be limited by the terms. The above terms are available only for distinguishing one component from another. For example, without departing from the scope of the present disclosure, a first component may be referred to as a second component, and similarly, a second component may also be referred to as a first component. The term "and/or" may include a combination of a plurality of related listed items or any of the plurality of related listed items.

The terms used in the present application may be only used to describe specific embodiments, and are not intended to limit the present disclosure. The singular expression may include the plural expression, unless the context clearly dictates otherwise. In the present application, it should be understood that terms such as "include," "comprise," or "have" are intended to designate that features, numerals, operations, operations, components, parts, or combination thereof described in the specification exists, but one or more other features this does not preclude the existence or addition of numbers, operations, operations, components, parts, or combinations thereof.

Unless defined otherwise, all terms used herein, including technical or scientific terms, have the same meaning as that which can commonly understood by one of ordinary skill in the art to which the present disclosure belongs. Terms such as those defined in a commonly used dictionary should be interpreted as including a meaning consistent with the meaning in the context of the related art, and should not be interpreted in an ideal or excessively formal manner unless explicitly defined in the present application.

Hereinafter, various exemplary embodiments of the present disclosure will be described in more detail with reference to the accompanying drawings.

FIG. 1 is a block diagram of a braking system 10 according to an exemplary embodiment of the present disclosure.

Referring to FIG. 1, the braking system 10 may include a main braking force regulator 100, an auxiliary braking force regulator 200, and an auto driving controller 300.

The main braking force regulator 100 may perform braking by receiving a signal related to a stroke of a brake pedal 400 reflecting a user's braking will and controlling hydraulic braking pressure of front and rear wheels of a vehicle. Here, the main braking force regulator 100 may detect a change in the stroke of the brake pedal 400 through a sensor attached to the brake pedal 400 to adjust the hydraulic braking pressure. The main braking force regulator 100 may be an integrated electrical booster, but an exemplary embodiment thereof is not limited thereto.

Furthermore, the main braking force regulator 100 may include first to fourth main hydraulic lines 110, 120, 130, and 140 connected to the front and rear wheels of the vehicle. The first to fourth main hydraulic lines 110, 120, 130, and 140 may be connected to a hydraulic braking device 500 provided on left and right sides of the front wheels and left and right sides of the vehicle, respectively. Here, the hydraulic braking device 500 may be a device generating braking force by adjusting a brake disk or a brake drum through hydraulic pressure.

The main braking force regulator 100 may be connected to the hydraulic braking device 500 via the auxiliary braking force regulator 200. Referring to FIG. 1, the main braking force regulator 100 may be connected to the auxiliary braking force regulator 200 through a first main hydraulic line 110 and a second main hydraulic line 120, and the auxiliary braking force regulator 200 may be connected to the hydraulic braking device 500 on the left and right sides of the front wheel through auxiliary braking hydraulic lines 210 and 211. The first main hydraulic line 110 of the main braking force regulator 100 may be connected to a hydraulic braking device 501 on the right side of the front wheel through the auxiliary braking hydraulic line 210 of the auxiliary braking force regulator 200, and the second main hydraulic line 120 of the main braking force regulator 100 may be connected to a hydraulic braking device 502 on the left side of the front wheel through the auxiliary braking hydraulic line 211 of the auxiliary braking force regulator 200, Furthermore, the main braking force regulator 100 may be connected to a hydraulic braking device 503 on the right side of the rear wheel through the second main hydraulic line 130, and may be connected to a hydraulic braking device 504 on the left side of the rear wheel through the fourth main hydraulic line 140.

Here, the main braking force regulator 100 is described as being connected via the hydraulic braking devices 501 and 502 of the front wheels and the auxiliary braking force regulator 200, but an exemplary embodiment thereof is not limited thereto, and the main braking force regulator 100 may be connected to the hydraulic braking devices 503 and 504 of the rear wheels via the braking force regulator 200, and the main braking force regulator 100 and the auxiliary braking force regulator 200 are not limited to a specific connection structure. In the instant case, the hydraulic braking devices 501 and 502 of the front wheels may be directly connected to the main braking force regulator 100. Here, a hydraulic braking device connected to the main braking force regulator 100 via the auxiliary braking force regulator 200 may be referred to as first hydraulic braking devices 501 and 502, and a hydraulic braking device 500, directly connected to the main braking force regulator 100 may be referred to as second hydraulic brake devices 503 and 504.

The auxiliary braking force regulator 200 may determine whether a failure has occurred in the main braking force regulator 100, and in the case that a failure has occurred in the main braking force regulator 100, may control braking force of the vehicle by replacing the main braking force regulator 100, The auxiliary braking force regulator 200 may be connected to the first hydraulic braking devices 501 and 502 through auxiliary braking hydraulic lines 210 and 211, and may control the hydraulic braking pressure of the first hydraulic braking devices 501 and 502, to generate braking force.

Furthermore, the auxiliary braking force regulator 200 may control wheels provided with the second hydraulic braking devices 503 and 504, which are not connected by hydraulic lines, using the electronically controlled braking device 600 connected thereto electrically. Here, the electrically connected electronically controlled braking device 600 may be an electrical parking brake (EPB). The auxiliary braking force regulator 200 may be connected to a right side RR of the rear wheel by a first electronically controlled braking control line 603, and may be connected to a left side RL of the rear wheel by a second electronically controlled braking control line 604. The auxiliary braking force regulator 200 may control the first electronically controlled braking device 601 and the second electronically controlled braking system provided on the rear wheels through the first electronically controlled braking control line 603 and the second electronically controlled braking control line 604, respectively, to generate braking force. The electronically controlled braking device 600 may include an electric motor, and generate braking force by operating the electric motor according to an electric signal.

Furthermore, the electronically controlled braking device 600 may apply different modes for generating braking force. Here, one mode for controlling the electronically controlled braking device 600 may be referred to as a first electronically controlled braking mode, and the other mode thereof may be referred to as a second electronically controlled braking mode. The first electronically controlled braking mode may be a mode generating braking force while gradually increasing rotation force of a, motor of the electronically controlled braking device 600. The second electronically controlled braking mode may be a mode in which an operation of generating and then releasing braking force is repeated according to an amount of wheel slip occurring in a wheel of the vehicle. In other words, the first electronically controlled braking mode may be a mode rotating an electric motor of the electronically controlled braking device 600 at a constant speed at a preset speed, and linearly generating braking force, and a mode for continuously rotating until a desired level of braking force is generated. Furthermore, the second electronically controlled braking mode may be a mode in which braking force is generated by operating the electronically controlled braking device 600, and may be a mode in which braking force is not generated by releasing the electronically controlled braking device 600 when wheel slip of a certain level or more occurs in a wheel provided with the electronically controlled braking device 600. In other words, when the first electronically controlled braking mode is a mode in which the braking force is linearly changed, the second electronically controlled braking mode may be a mode in which the braking force is non-linearly generated, such as an operation type in which braking force is repeatedly generated and released. Furthermore, the second electronically controlled braking mode may be a mode in which the same function as that of the anti-lock braking system (ABS) using the hydraulic braking device 500 of the vehicle is performed using the electronically controlled braking device 600.

Also, the auxiliary braking force regulator 200 may control the regenerative braking controller 700 using a regenerative braking control line 710. Here, the regenerative braking controller 700 may be a device configured for controlling an electric motor generating driving force in a vehicle, to act as a generator, to generate braking force through a process of converting kinetic energy of the vehicle into electrical energy. Here, the vehicle including the regenerative braking controller 700 may be an electric vehicle or a hybrid vehicle.

The auxiliary braking force regulator 200 may receive a stroke signal of a brake pedal 400 reflecting a user's braking intention and control the first hydraulic braking devices 501 and 502 to generate braking force. The auxiliary braking force regulator 200 may detect a change in a stroke of the brake pedal 400 through a sensor attached to the brake pedal 400 to adjust the hydraulic braking pressure. Here, the brake pedal 400 may be connected to the main braking force regulator 100 and the auxiliary braking force regulator 200, respectively. Information on the change in the stroke of the brake pedal 400 may be transmitted to the main braking force regulator 100 when the main braking force regulator 100 is normally operating, and in the case that a failure has occurred in the main braking force regulator, the information may be transmitted to the auxiliary braking force regulator 200. Therefore, even in the case that a failure has occurred in the main braking force regulator 100, the auxiliary braking force regulator 200 may detect the change in the stroke of the brake pedal 400, and receive the user's braking will to control the braking force.

The auxiliary braking force regulator 200 may receive a signal related to the stroke of the brake pedal 400 reflecting the user's braking will and control the first hydraulic braking devices 501 and 502 to generate braking force. The auxiliary braking force regulator 200 may adjust the hydraulic braking pressure through a sensor attached to the brake pedal 400 based on information of the change in the stroke such as a regulation amount, a regulation speed, and the like, of the brake pedal 400. Here, the brake pedal 400 may be connected to the main braking force regulator 100 through a first stroke transmission line 410, and connected to the auxiliary braking force regulator 200 through a second stroke transmission line 420, respectively. When the main braking force regulator 100 is normally operating, the information of the change in the stroke of the brake pedal 400 may be transmitted to the main braking force regulator 100 through the first stroke transmission line 410. Conversely, in the case that a failure has occurred in the main braking force regulator 100, information of the change in the stroke of the brake pedal 400 may be transmitted to the auxiliary braking force regulator 200 through the second stroke transmission line 420. Therefore, even in the case that a failure has occurred in the main braking force regulator 100, the auxiliary braking force regulator 200 may receive the user's braking intention and control the braking force based on the information of the change in the stroke of the brake pedal 400.

Furthermore, the auxiliary braking force regulator 200 may determine whether an anti-lock braking system (ABS) is operating. Here, to secure driving stability of a vehicle, the anti-lock braking system (ABS) may be a system that maintains a speed of all wheels provided in the vehicle similarly by detecting a speed of the wheel provided in the vehicle and braking a wheel having a high wheel speed to lower the wheel speed. In the braking system 10 according to an exemplary embodiment of the present disclosure, the anti-lock braking system (ABS) may be performed using the first hydraulic braking devices 501 and 502 in a state in which a failure has occurred in the main braking force regulator 100. In the case that the anti-lock braking system (ABS) is performed using only the first hydraulic braking devices 501 and 502, driving stability of the vehicle may be further improved by performing the second electronically controlled braking mode of the electronic control braking device 600 together. Meanwhile, when the anti-lock braking system (ABS) is performed using only the first hydraulic braking devices 501 and 502, to secure driving stability of the vehicle, the auxiliary braking force regulator 200 may not perform braking using the regenerative braking controller 700 and the first electronically controlled braking mode of electronically controlled braking device 600.

The autonomous driving controller 300 may determine whether the main braking force regulator 100 and the auxiliary braking force regulator 200 are operating normally, and may stop the vehicle in the case that a failure has occurred in the main braking force regulator 100 and the auxiliary braking force regulator 200, using the regenerative braking controller 700 for the safety of the user. The autonomous driving controller 300 may be connected to the main braking force regulator 100 through a first autonomous driving control line 310, and connected to the auxiliary braking force regulator 200 through a second autonomous driving control line 320. Therefore, when the main braking force regulator 100 is normally operating, the autonomous driving controller 300 may autonomously drive by exchanging information with the main braking force regulator 100 through the first autonomous driving control line 310. Furthermore, even in the case that a failure occurs in the main braking force regulator 100, the autonomous driving controller 300 may autonomously drive by exchanging information with the auxiliary braking force regulator 200 through the second autonomous driving control line 320. Furthermore, since the autonomous driving controller 300 is connected to the regenerative braking controller 700, in the case that a failure has occurred in both the main braking force regulator 100 and the auxiliary braking force regulator 200, the autonomous driving controller 300 may stop the vehicle using the regenerative braking controller 700.

The autonomous driving controller 300 may be a highway driving pilot (HDP), but an exemplary embodiment thereof is not limited thereto, and may be a device configured for controlling a vehicle without a driver's control. Meanwhile, the braking system 10 may be operated even if the autonomous driving controller 300 is omitted.

Components of the braking system 10 may be wired or wirelessly connected to exchange information. For example, data may be exchanged using communication means such as Ethernet, media oriented systems transport (MOST), Flexray, controller area network (CAN), local interconnect network (LIN), Internet, LTE, 5G, Wi-Fi, Bluetooth, near field communication (NEC), Zigbee®, radio frequency (RI), and the like.

Here, the main braking force regulator 100 and the auxiliary braking force regulator 200 may be connected through an additional wire 160 in addition to the common communication line 150 provided in the vehicle. For example, the main braking force regulator 100 and the auxiliary braking force regulator 200 may be connected to two lines, which are CAN and separate wiring. The main braking force regulator 100 may transmit a constant signal to the auxiliary braking force regulator 200 through CAN, and the auxiliary braking force regulator 200 may determine whether a failure has occurred in the main braking force regulator through a change in the received signal. Furthermore, the main braking force regulator 100 may apply a constant voltage to the auxiliary braking force regulator 200 through wiring, and when the received voltage drops below a certain level, the auxiliary braking force regulator 200 may determine whether a failure has occurred in the main braking force regulator 100. Here, a communication line through which a failure of the main braking force regulator 100 and the auxiliary braking force regulator 200 may be determined may be referred to as a first failure determining line 150, and an additional wiring connection line may be referred to as a second failure determining line 160. Through the doubly connected failure determining line, even when one of the failure determining lines does not operate normally, it is possible to more accurately determine whether a failure has occurred in the main braking force regulator 100.

In the case that a failure has occurred in the main braking force regulator 100, the braking system 10 according to an exemplary embodiment of the present disclosure may be a system configured for stably driving by use of the auxiliary braking force regulator 200 to generate braking force, almost identical to that of the main braking force regulator 100 in a normal state. Here, the main braking force regulator 100 may control the first hydraulic braking devices 501 and 502 and the second hydraulic braking devices 503 and 504 of the vehicle, and the auxiliary braking force regulator 200 may control only the first hydraulic pressure braking devices 501 and 502. In other words, compared to the case where the hydraulic braking device 500 is adjusted using the main braking force regulator 100, when the auxiliary braking force regulator 200 is used, the second hydraulic braking devices 503 and 504 cannot generate braking force, so that the braking force may be insufficient, and when braking force is generated using only the first hydraulic braking devices 501 and 502, excessive braking force is applied to wheels provided with the first hydraulic braking devices 501 and 502, so that excessive wheel slip may occur, which may impair the driving stability of the vehicle. The auxiliary braking force regulator 200 according to an exemplary embodiment of the present disclosure may adjust braking force using at least one of the electronically controlled braking device 600 and the regenerative braking controller 700, together with the first hydraulic braking devices 501 and 502 according to a driving state of the vehicle. The auxiliary braking force regulator 200 may adjust the braking force using the electronically controlled braking device 600 and the regenerative braking controller 700, together with the first hydraulic braking devices 501 and 502, so that a lack of braking power caused not by use of the second hydraulic braking device 503 and 504 may be supplemented and the driving stability of the vehicle may be improved.

Figure 2:
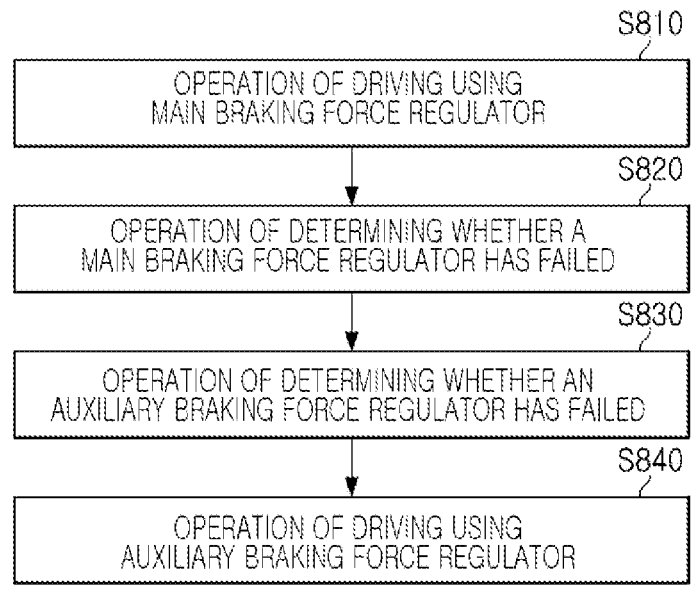
FIG. 2 is a diagram illustrating control operations of a braking system according to an exemplary embodiment of the present disclosure.
Figure 3:
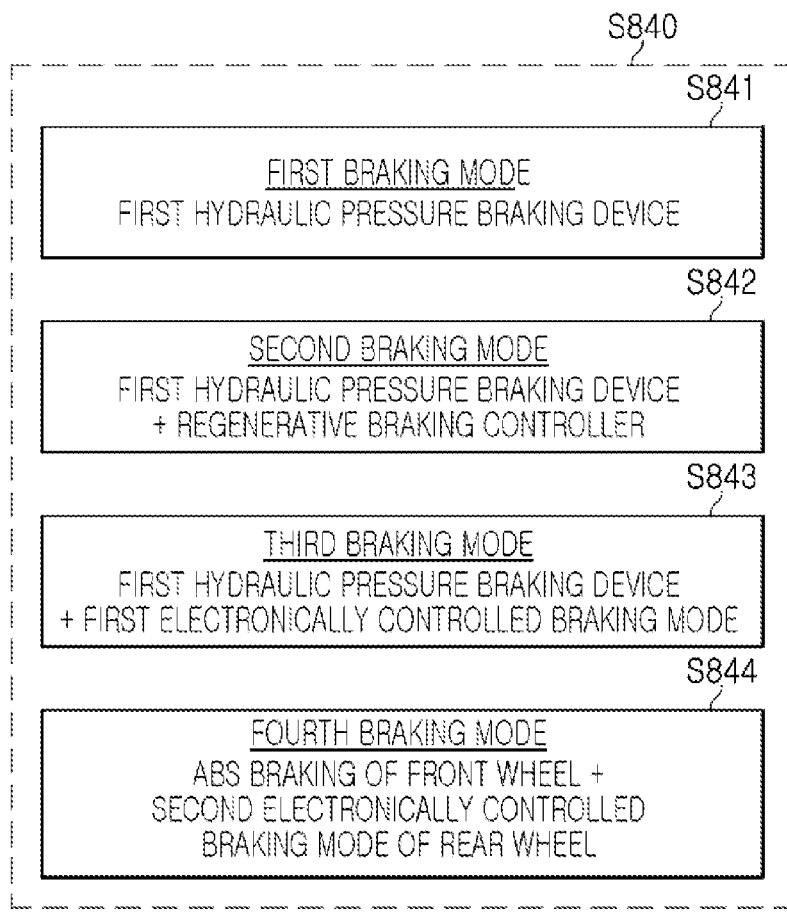
FIG. 3 is a diagram illustrating a braking mode in operation S840 according to an exemplary embodiment of the present disclosure.

FIG. 2 is a diagram illustrating control operations of the braking system 10 according to an exemplary embodiment of the present disclosure, and FIG. 3 is a detailed diagram of operation S840 according to an exemplary embodiment of the present disclosure.

Referring to FIG. 2 and FIG. 3, the vehicle may be driven while adjusting braking force using the hydraulic braking device 500 of the front and rear wheels using the main braking force regulator 100 (S810). While driving, the auxiliary braking force regulator 200 may determine whether a failure has occurred in the main braking force regulator 100 (S820). The main braking force regulator 100 may be connected to the main braking force regulator 100 by two lines including a communication line 150 including CAN and a separate wiring 160, to determine whether a failure has occurred. The main braking force regulator 100 may transmit a constant signal to the auxiliary braking force regulator 200 through CAN, and the auxiliary braking force regulator 200 may determine whether a failure has occurred in the main braking force regulator 100 through a change in the received signal. Furthermore, the main braking force regulator 100 may apply a constant voltage to the auxiliary braking force regulator 200 through a wiring, and it may be determined that a failure has occurred in the main braking force regulator 100 when the received voltage drops below a certain level.

When it is confirmed that the main braking force regulator 100 has failed, the autonomous driving controller 300 may determine whether the auxiliary braking force regulator 200 has failed (S830), Like the main braking force regulator 100, the auxiliary braking force regulator 200 may also transmit a constant signal through CAN. The autonomous driving controller 300 may determine whether the auxiliary braking force regulator is fixed based on the CAN signal transmitted from the auxiliary braking force regulator 200. In the case that a failure has occurred in both the auxiliary braking force regulator 200 and the main braking force regulator 100, the vehicle cannot be driven normally. Accordingly, in the case that a failure has occurred in both the auxiliary braking force regulator 200 and the main braking force regulator 100, the autonomous driving controller 300 may control the regenerative braking controller 700 to stop the vehicle.

When the auxiliary braking force regulator 200 is operating normally, the vehicle may continue to be driven while adjusting braking force of the vehicle using the auxiliary braking force regulator 200 (S840). To generate braking force, the auxiliary braking force regulator 200 is available to be driven while controlling braking force in a braking mode set by use of at least one braking device among the first hydraulic braking devices 501 and 502, the electronically controlled braking device 600, and the regenerative braking controller 700 to generate braking force.

Referring to FIG. 3, the auxiliary braking force regulator 200 may include four braking modes S841, S842, S843, and S844. The first braking mode S841 may be a mode in which braking force is adjusted using only the first hydraulic braking devices 501 and 502. The second braking mode S842 may be a mode in which braking force is adjusted using the first hydraulic braking devices 501 and 502 and the regenerative braking controller 700. The third braking mode S843 and the fourth braking mode S844 may be modes in which braking force is adjusted using the first hydraulic braking devices 501 and 502 and the electronically controlled braking device 600. Here, the third braking mode may be a mode in which the electronically controlled braking mode 600 is controlled in the first electronically controlled braking mode, and the fourth braking mode may be a mode in which the electronically controlled braking device 600 is controlled in the second electronically controlled braking mode, to adjust the braking force.

Unlike the main braking force regulator 100 configured for controlling the first hydraulic braking devices 501 and 502 and the second hydraulic braking devices 503 and 504, the auxiliary braking force regulator 200 may control only the first hydraulic braking devices 501 and 502 among the hydraulic braking devices 500. In other words, the main braking force regulator 100 may use both the hydraulic devices of the front and rear wheels of the vehicle, but the auxiliary braking force regulator 200 may use only one of the hydraulic devices of the front and rear wheels of the vehicle. When braking force is generated using only the first hydraulic braking devices 501 and 502, compared to a case where the braking force is generated using both the first hydraulic braking devices 501 and 502 and the second hydraulic braking devices 503 and 504, there may be a higher concern that occurrence of a wheel slip may increase, and driving stability of the vehicle may become unstable. For example, when braking force of 100 Nm is required to brake a vehicle, the braking force of 100 Nm may be generate by simultaneously using the first hydraulic braking devices 501 and 502 and the second hydraulic braking devices 503 and 504, and the braking force of 50 Nm and 50 Nm or 40 Nm and 60 Nm may be generated in the first hydraulic brake devices 501 and 502 and the second hydraulic brake devices 503 and 504, respectively. In contrast thereto, the auxiliary braking force regulator 200 is used to generate braking force, and the first hydraulic braking devices 501 and 502 are available to generate braking force of 100 Nm. Therefore, in the case of using the auxiliary braking force regulator 200, more braking force should be generated in a single hydraulic braking device 500, than in the case of using the main braking force regulator 100, and when a magnitude of the braking force is greater than a certain level, excessive wheel slip occurs, making it difficult to normally generate braking force. Therefore, the braking system 10 according to an exemplary embodiment of the present disclosure may generate braking force using the regenerative braking controller 700 or the electronically controlled braking device 600 together with the first hydraulic braking devices 501 and 502, to stably control the vehicle.

Figure 4:
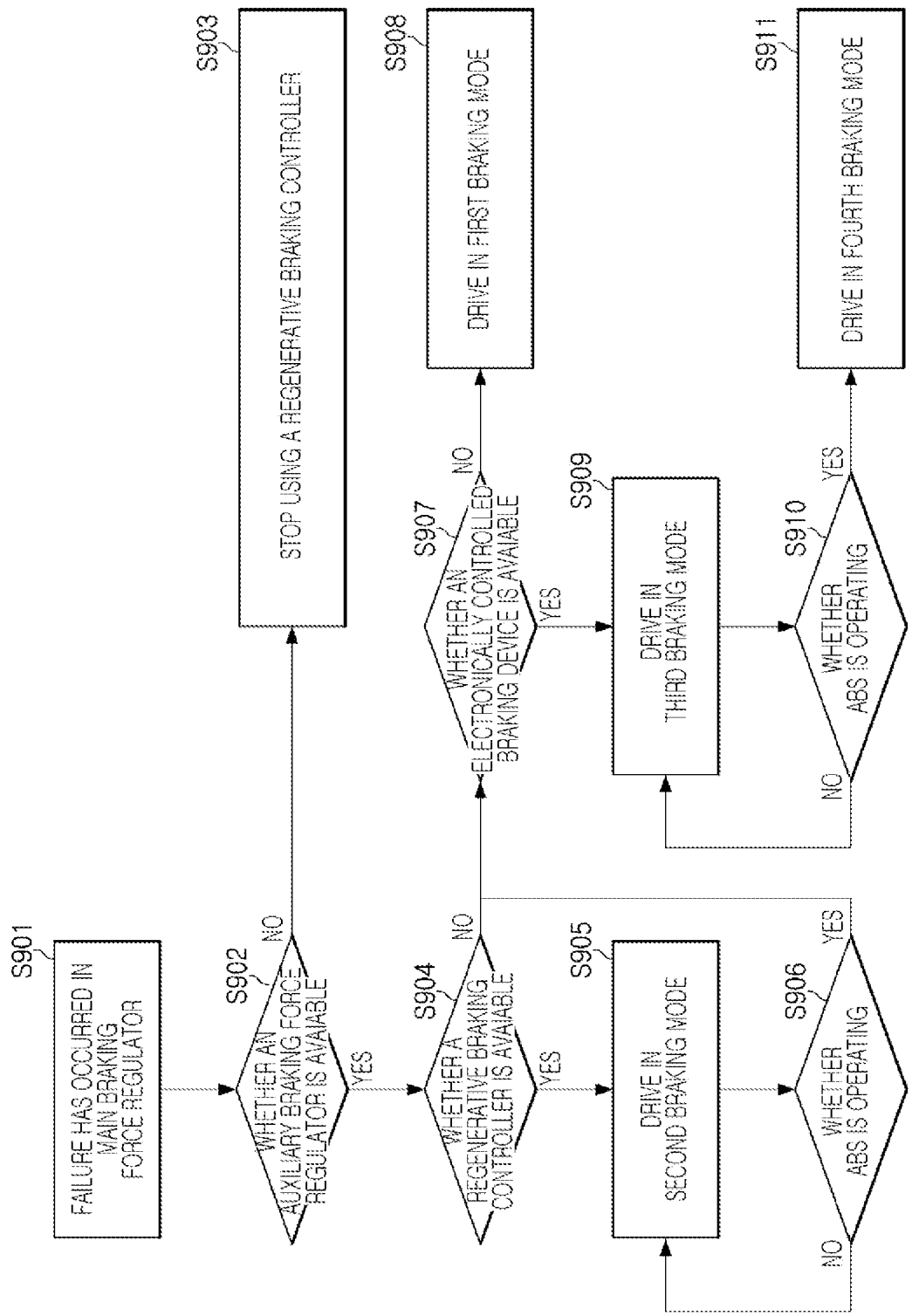
FIG. 4 is a flow diagram of a braking system according to an exemplary embodiment of the present disclosure.

FIG. 4 is a flow diagram of a braking system 10 according to an exemplary embodiment of the present disclosure.

Referring to FIG. 4, a failure may occur in a main braking force regulator 100 while driving (S901). An auxiliary braking force regulator 200 may determine whether a failure has occurred in the main braking force regulator 100 through a first failure determining line 150 and the second failure determining line 150

In the case that a failure has occurred in the main braking force regulator 100, it is possible to determine whether a failure has occurred in the auxiliary braking force regulator 200 (S902). In the case that a failure has occurred in the auxiliary braking force regulator 200, the vehicle must be stopped for safety because there is no means for adjusting the braking force of the hydraulic braking device 500 of the vehicle. Furthermore, the autonomous driving controller 300 can determine whether a failure of the main braking force regulator 100 and the auxiliary braking force regulator 200 has occurred through a communication system (e.g., CAN) provided in the vehicle, In the case that a failure has occurred in both the main braking force regulator 100 and the auxiliary braking force regulator 200, the vehicle may be stopped by generating braking force using a regenerative braking controller 700 (S903).

When the auxiliary braking force regulator 200 is available, the auxiliary braking force regulator 200 may determine whether the regenerative braking controller 700 is available (S904). When it is confirmed that the regenerative braking controller 700 may not be used, it is possible to determine whether an electronically controlled braking device 600 is available (S907). When it is confirmed that the electronically controlled braking device 600 is also unavailable, the vehicle may be driven while controlling braking force in a first braking mode (S908). Here, the first braking mode may be a mode generating braking force using only the first hydraulic braking devices 501 and 502.

When the regenerative braking controller 700 is available, the vehicle may be driven while adjusting braking force in a second braking mode (S905). Here, the second braking mode may be a mode adjusting braking force using the first hydraulic braking devices 501 and 502 and the regenerative braking controller 700.

The auxiliary braking force regulator 200 drives in the second braking mode, and may continuously or periodically determine whether an anti-lock braking system (ABS) is operating (S906), Here, to secure driving stability of a vehicle, the anti-lock braking system (ABS) may be a system for maintaining a speed of all wheels provided in a vehicle, by detecting a speed of the wheel provided in the vehicle and braking a wheel having a high wheel speed to lower the wheel speed. Furthermore, the anti-lock braking system (ABS) may be performed using the hydraulic braking system 500 of the vehicle, and in the case of driving using the auxiliary braking force regulator 200, the anti-lock braking system (ABS) may be performed using the first hydraulic braking device 501 and 502.

When the anti-lock braking system (ABS) is operating in the vehicle, it is possible to determine whether the electronically controlled braking device 600 is available (S907). As described above, when it is confirmed that the electronically controlled braking device 600 is unavailable, the vehicle may be driven in a first braking mode in which braking force is adjusted using only the first hydraulic braking devices 501 and 502 (908), When it is confirmed that the electronically controlled braking device 600 is unavailable, the vehicle may be driven while controlling braking force in a third driving mode (S909). Here, the third braking mode may be a mode in which the braking force is adjusted by use of the first hydraulic, braking device 501 and 502 and the first electronically controlled braking mode of the electronically controlled braking device 600, Furthermore, the first electronically controlled braking mode may be a mode for constantly rotating an electric motor of the electronically controlled braking device 600 at a preset speed, to continuously be rotated until a target level of braking force is generated.

The auxiliary braking force regulator 200 may be driven in a third braking mode, and may continuously or periodically determine whether an anti-lock braking system (ABS) is operating (S910), When the anti-lock braking system (ABS) is operating in the vehicle, the vehicle may be driven while controlling braking force in a fourth braking mode, Here, the fourth braking mode may be a mode for adjusting braking force by use of the first hydraulic braking devices 501 and 502 and a second electronically controlled braking mode of the electronically controlled braking device 600, Furthermore, the second electronically controlled braking mode may be a mode for generating braking force by operating the electronically controlled braking device 600, and may be a mode for releasing the braking force generated from the electronically controlled braking device 600, when a slip of a certain level or more occurs in a wheel provided with the electronically controlled braking device 600.

The methods according to an exemplary embodiment of the present disclosure may be implemented in a form of program instructions which may be executed by various computer means and recorded on a computer readable medium. Computer readable media may include program instructions, data files, data structures, and the like, alone or in a combination thereof. The program instructions recorded on the computer readable medium may be specially designed and configured for an exemplary embodiment of the present disclosure, or may be known and usable to those skilled in the art of computer software.

Examples of computer readable media include hardware devices specially configured to store and execute program instructions, such as ROM, RAM, flash memory, and the like. Examples of the program instructions include high-level language codes which may be executed by a computer using an interpreter or the like as well as machine language codes such as those produced by a compiler. The hardware device described above may be configured to operate with at least one software module to perform the operations of the present disclosure, and vice versa.

As set forth above, according to an exemplary embodiment of the present disclosure, in the case that a failure has occurred in a main braking force regulator, by simultaneously controlling an electronically controlled braking device and regenerative braking together with a portion of the hydraulic braking devices using an auxiliary braking force regulator, braking force of the vehicle may be more stably controlled.

According to an exemplary embodiment of the present disclosure, even in the case that a failure has occurred in the main braking force regulator, an optimal braking force may be provided while securing driving stability of a vehicle by determining whether an anti-lock braking system of the vehicle is operating.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A braking system, comprising:
   a hydraulic braking apparatus including a first hydraulic braking apparatus provided on one of front and rear wheels of a vehicle and a second hydraulic braking apparatus provided on another of the front and rear wheels of the vehicle;
   a non-hydraulic braking apparatus configured for generating braking force in a wheel provided with the second hydraulic braking apparatus among the front and rear wheels;
   a main braking force regulator configured for regulating braking force by controlling hydraulic braking pressure supplied to the first hydraulic braking apparatus and the second hydraulic braking apparatus; and
   an auxiliary braking force regulator configured for regulating braking force by controlling at least one braking apparatus of the first hydraulic braking apparatus and the non-hydraulic braking apparatus, when a failure has occurred in the main braking force regulator,
   wherein the non-hydraulic braking apparatus includes at least one of an electronically controlled braking apparatus and a regenerative braking controller,
   wherein the auxiliary braking force regulator selects at least one braking mode from a plurality of braking modes in which the first hydraulic braking apparatus, the electronically controlled braking apparatus, and the regenerative braking controller are selectively combined, and
   wherein the auxiliary braking force regulator selects the at least one braking mode by determining whether the electronically controlled braking apparatus is available, when the regenerative braking controller is unavailable.

2. The braking system of claim 1, wherein the electronically controlled braking apparatus is an electronic parking brake (EPB).

3. The braking system of claim 1, wherein the auxiliary braking force regulator is configured to control at least one of the first hydraulic braking apparatus, the electronically controlled braking apparatus, and the regenerative braking controller based on whether an anti-lock braking system (ABS) is operating.

4. The braking system of claim 1, further including:
   an autonomous driving controller configured for determining whether a failure has occurred in the main braking force regulator and the auxiliary braking force regulator,
   wherein the autonomous driving controller is configured to stop the vehicle using the regenerative braking controller, when the failure has occurred in the main braking force regulator and the auxiliary braking force regulator.

5. The braking system of claim 1, wherein the electronically controlled braking apparatus includes a first electronically controlled braking mode and a second electronically controlled braking mode, generating braking force.

6. The braking system of claim 5, wherein the first electronically controlled braking mode is a mode that linearly generates the braking force of the electronically controlled braking apparatus.

7. The braking system of claim 5, wherein the second electronically controlled braking mode is a mode that non-linearly generates the braking force of the electronically controlled braking apparatus.

8. The braking system of claim 5, wherein, in the second electronically controlled braking mode, an operation of generating and releasing the braking force of the electronically controlled braking apparatus is repeatedly performed, using the electronically controlled braking apparatus based on a slip amount of a wheel provided with the electronically controlled braking apparatus among the front and rear wheels.

9. A braking method of a braking system including a main braking force regulator controlling hydraulic braking pressure of a first hydraulic braking apparatus provided on one of front and rear wheels of a vehicle and a second hydraulic braking apparatus provided on another of the front and rear wheels of the vehicle and an auxiliary braking force regulator controlling the hydraulic braking pressure of the first hydraulic braking apparatus, the braking method comprising:
   driving using the main braking force regulator;
   determining whether a failure has occurred in the main braking force regulator; and
   driving using the auxiliary braking force regulator controlling braking force by use of at least one of the first hydraulic braking apparatus, an electronically controlled braking apparatus, and a regenerative braking controller, when the failure has occurred in the main braking force regulator,
   wherein the driving using the auxiliary braking force regulator further includes selecting at least one braking mode from a plurality of braking modes in which the first hydraulic braking apparatus, the electronically controlled braking apparatus, and the regenerative braking controller are selectively combined, and,
   wherein the selecting the braking mode further includes:
   determining whether the regenerative braking controller is available; and
   determining whether the electronically controlled braking apparatus is available, when the regenerative braking controller is unavailable.

10. The braking method of claim 9, further including:
    determining whether a failure has occurred in the auxiliary braking regulator, when the failure has occurred in the main braking force regulator,
    wherein, when the failure has occurred in the auxiliary braking force regulator, the vehicle is stopped using the regenerative braking controller.

11. The braking method of claim 9, wherein the driving using the auxiliary braking force regulator further includes:
    driving while controlling braking force based on the selected at least one braking mode.

12. The braking method of claim 9, wherein in the determining whether the electronically controlled braking apparatus is available,
    a first braking mode controlling braking force using the first hydraulic braking apparatus is selected as the at least one braking mode among the plurality of braking modes, when the electronically controlled braking apparatus is unavailable.

13. The braking method of claim 9, wherein, when the regenerative braking controller is available, the determining whether the regenerative braking controller is available, includes:
    selecting a second braking mode generating braking force as the at least one braking mode among the plurality of braking modes by controlling the first hydraulic braking apparatus and the regenerative braking controller;
    determining whether the anti-lock braking system (ABS) is operating; and driving in the second braking mode, and performing the determining whether the anti-lock braking system (ABS) is operating in real time or periodically, wherein, when the anti-lock braking system (ABS) is operating, the determining whether the electronically controlled braking device is available is performed.

14. The braking method of claim 9, wherein, when the electronically controlled braking apparatus is available, the determining whether the electronically controlled braking device is available includes:

selecting a third braking mode generating braking force as the at least one braking mode among the plurality of braking modes by controlling the first hydraulic braking apparatus and the electronically controlled braking apparatus;

determining whether the anti-lock braking system (ABS) is operating; and driving in the third braking mode, and performing the determining whether the anti-lock braking system (ABS) is operating in real time or periodically, wherein the third braking mode is controlled by a first electronically controlled braking mode that linearly generates the braking force of the electronically controlled braking apparatus.

15. The braking method of claim 14, wherein, when the anti-lock braking system (ABS) is operating, the first hydraulic braking apparatus is controlled according to the anti-lock braking system (ABS), and the electronically controlled braking apparatus drives in a fourth braking mode that non-linearly generates braking force.

16. The braking method of claim 15, wherein in the fourth braking mode, the braking force of the electronically controlled braking apparatus is controlled based on an amount of a wheel slip generated in a wheel provided with the electronically controlled braking apparatus among the front and rear wheels.

17. The braking method of claim 9, wherein the electronically controlled braking apparatus is an electronical parking brake (EPB).

* * * * *